Sept. 26, 1944.   F. H. BEACH   2,358,782
ELECTROMAGNETIC CHECK GAUGE
Filed Sept. 28, 1942   2 Sheets-Sheet 1
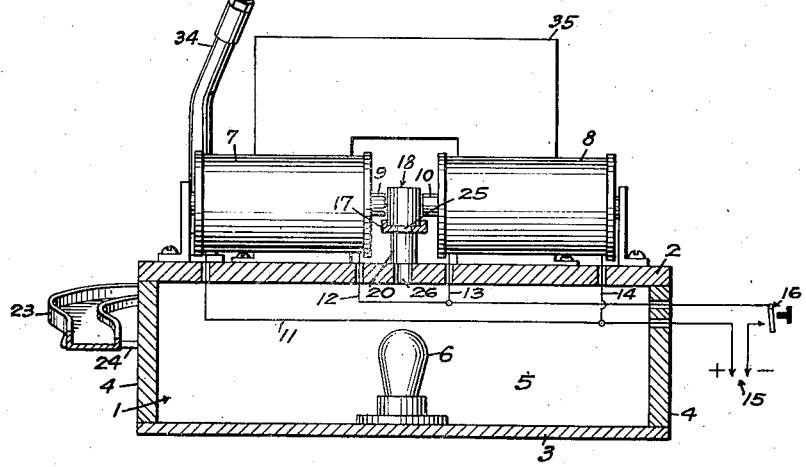
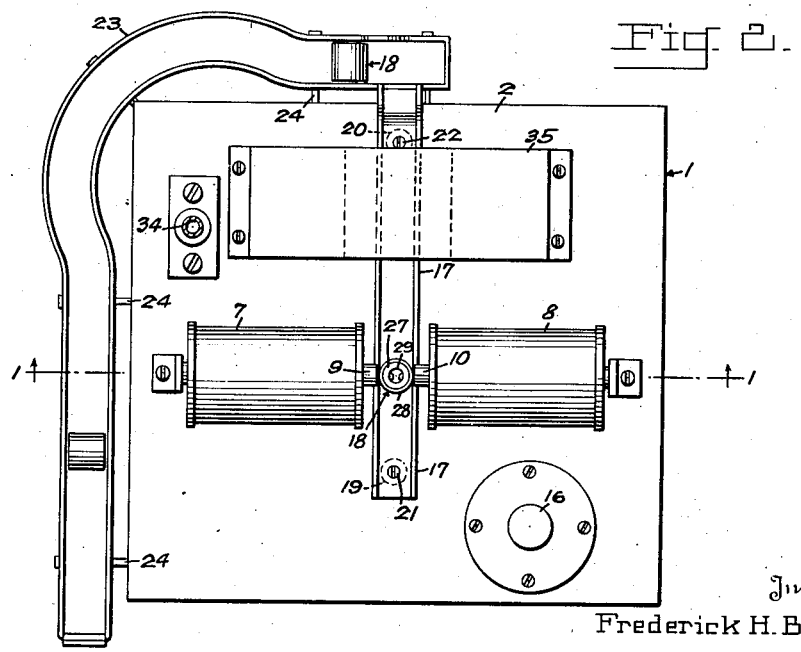
Inventor
Frederick H. Beach
By G. J. Kessenich + W. E. Thibodeau
Attorneys Sept. 26, 1944.     F. H. BEACH     2,358,782
ELECTROMAGNETIC CHECK GAUGE
Filed Sept. 28, 1942     2 Sheets-Sheet 2
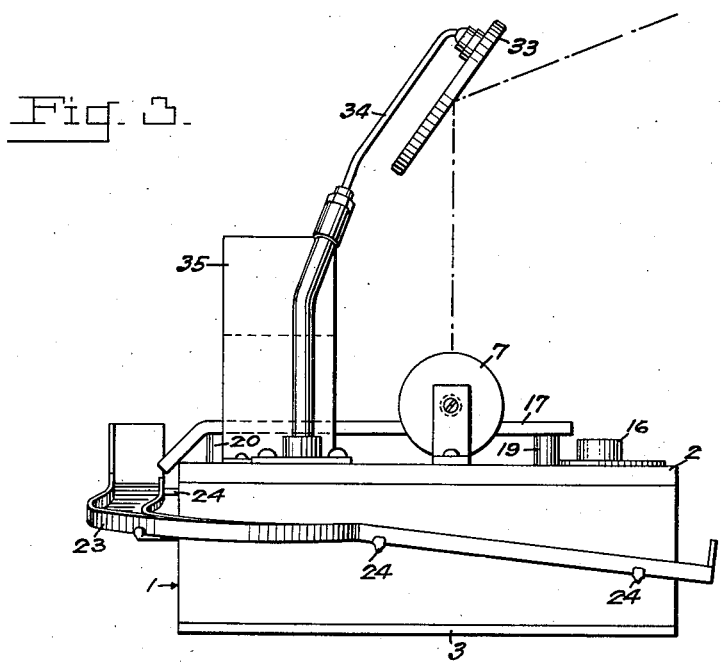
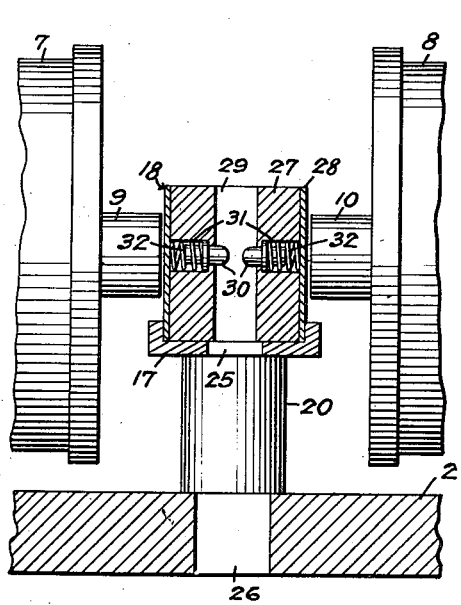
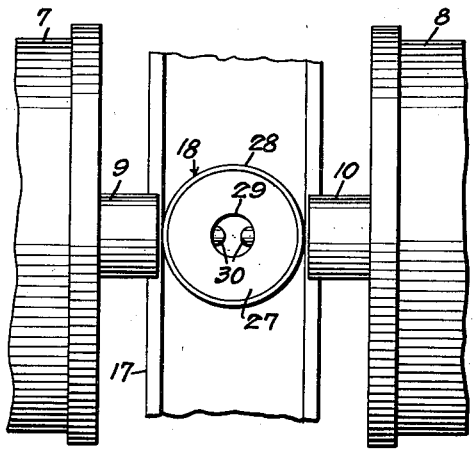
Inventor
Frederick H. Beach
By G. J. Kessenich - W. E. Thibodeau
Attorneys Patented Sept. 26, 1944

2,358,782

UNITED STATES PATENT OFFICE 2,358,782

ELECTROMAGNETIC CHECK GAUGE

Frederick H. Beach, Denville, N. J.

Application September 28, 1942, Serial No. 459,914

2 Claims. (Cl. 73—432)

(Granted under the act of March 3, 1883, as amended April 30, 1928; 370 O. G. 757)

The invention described herein may be manufactured and used by or for the Government for governmental purposes, without the payment to me of any royalty thereon.

The present invention relates to apparatus for checking or verifying the assembly of assembled fabricated parts or of units which contain means or components which operate against, or in connection with, the tension of a spring.

Many assembled fabricated parts or units included in apparatus or machines contain springs which yieldingly hold certain components thereof in a desired position while permitting motion or retraction of the said components under conditions accompanying the use of the said assembled parts. In many instances these springs are hidden from view in the assembled parts while at least a portion of the said components may be exposed to view.

The present invention is concerned with those types of assembled units in which the said components are at least partly exposed to view and in which the springs may or may not be concealed from view.

It is among the objects of the present invention to provide means for determining, in advance of actual use, how these yieldingly held components will function in connection with their springs, whereby verification or checking of the assembly becomes possible.

While the present invention may be used to verify the assembly of various kinds of assembled parts or units, an embodiment of the invention is described hereinafter, for illustrative purposes, in connection with checking or verifying the assembly of a part of a projectile fuze, which has among its components two plungers capable of acting, for example, as detents and which move against the action of springs which are hidden from view in the assembly. However, in this illustrative assembly, a portion of each of the two plungers is so related to an opening in the said fuze part that it may be seen and illuminated by a beam of light.

In the accompanying drawings which illustrate one form which the invention may assume, Figure 1 is a vertical section of the apparatus taken on the line 1—1 of Figure 2.

Figure 2 is a plan view of the apparatus with the mirror (hereinafter referred to) removed.

Figure 3 is a side elevation of the apparatus looking from the left of Figure 2.

Figure 4 is a fragmentary vertical section showing, in section, the assembled unit to be checked or verified.

Figure 5 is a plan view of the parts shown in Figure 4.

Referring to the drawings in which the same numeral indicates the same part in all the views, the numeral 1 designates a housing having the top 2 and the bottom 3 which are spaced from each other by four side walls, two of which are indicated by the numerals 4 and 5 in Figure 1. The housing provides support for parts of the apparatus and a space in which to place the electric light 6 which is supported by and attached to the bottom 3 of the housing.

On the top 2 of the housing are secured two electromagnets 7 and 8 having respectively oppositely disposed cores 9 and 10 which are spaced from each other sufficiently to permit the assembled units to be checked to slide fit between them. In the embodiment shown the axes of the two electromagnets are substantially in the same line. If desired the electromagnets may be adjustable to and from each other to accommodate the apparatus to the checking of assembled units of various sizes.

The two electromagnets 7 and 8 are connected in multiple, by means of conductors 11, 12, 13 and 14, with a source of direct current, said source being indicated generally by the numeral 15 in Figure 1. A switch 16 shown schematically in Figure 1, is provided in the circuit which supplies current to the two electromagnets. By means of such a switch, the electromagnets may be energized or de-energized at will by the user of the apparatus. In Figures 2 and 3 the switch 16 is shown as a button switch. By depressing the button of this switch by means of the finger the circuit is closed and the two electromagnets energized. By releasing the button from pressure, the circuit is opened and the two electromagnets are de-energized.

A track or guide way 17 is provided for conducting and positioning the assembled units 18 to be checked or verified between the cores or poles of the electromagnets. This track has two legs 19 and 20 by means of which it is supported above the top 2 of the housing. The track 17 is secured to the top 2 of the housing by screws or bolts 21 and 22 passing through said legs and engaging with the said top.

At the rear of the apparatus the track 17 extends somewhat beyond the housing 1 and is bent down at this end to discharge the checked assembled units onto another track or guide way 23 which is secured to the sides of the housing 1 by brackets 24. This track 23 passes around from the rear of the apparatus to the front and is inclined to cause round or cylindrical units to roll towards the front of the apparatus. As will be seen from an inspection of the drawings the tracks 17 and 23 have elevated guide walls along their edges for properly confining the units to the tracks.

The track 17 is provided with an opening 25. In the embodiment of the inventions shown, this opening is in the form of a round hole whose center is located vertically below the point on the axes of the electromagnets which is midway between the ends of the cores 9 and 10. This opening 25 is in vertical alignment with the opening 26 in the top 2 of the housing. The electric light 6 is positioned below the opening 26, whereby light is able to pass from the light 6 through opening 26 and then through opening 25.

The position of openings 25 and 26 will depend upon the construction of the assembled units to be tested or checked. In the present embodiment of the invention, they are placed in the positions indicated owing to the fact that the assembled unit 18 to be checked, and illustrated by way of example, is cylindrical in form and has an opening along its axis.

The construction of the above mentioned unit 18 is shown in Figures 4 and 5. It comprises a cylindrical metal body 27 held within a surrounding cylinder or sleeve 28. The metal body 27 is provided with a central hole 29 which passes from end to end of the body. The unit 18 also comprises two shouldered plungers 30 which are fitted in holes 31 in the body. The holes 31 extend radially from the central hole 29 to the sleeve 28. A spring 32 is located between each of the shoulders on the plungers and the sleeve 28. The shoulders on the plungers engage shoulders in the holes which limit the inward motion of the plungers 30. The plungers are so fitted in the unit that they move outwardly against the springs 32, and in their innermost position project into the hole 29.

In the use of the apparatus an assembled unit 18 is placed on the track 17 and moved thereon to a position between the ends of the cores 9 and 10 of the electromagnets 7 and 8. In this position, light passes from the electric light 6 through opening 26 in the top 2 of the housing 1 and through opening 25 in the track 17 into the hole 29 of the assembled unit. By looking down through the hole 29 in the assembled unit the plungers may be observed. The switch 16 is then closed to energize the electromagnets. The electromagnets pull the plungers 30 outwardly towards the poles or cores 7 and 8 of the magnets, against the action of the springs 32. Upon opening the switch 16 the electromagnets are de-energized, and if the assembly is correct, the plungers should return to their innermost positions. By successively closing and opening the switch 16, more or less rapidly, an estimate of the fit of the plungers in the unit and of the accuracy of action may be made by observing the movement of the innermost ends of the plungers which normally extend into the hole 29. In the event that a plunger fails to return to its innermost position, it will now be apparent that either a spring 32 is absent from the assembly or that there is some binding action upon the plunger. By holding the switch 16 closed for sufficient time, one may observe whether the innermost ends of the plungers 30 may be retracted completely from the hole 29, or to what extent they are retracted.

To facilitate observation of the plungers, a mirror 33 may be adjustably mounted on a support 34 which is attached to the top 2 of the housing 1. By suitably adjusting the position of the mirror one may observe the motion of the plungers 30 without it being necessary for the observer to place his eyes directly above the unit under observation.

After the assembly of one assembled unit 18 has been checked, another unit is placed upon the track and advanced thereon into position, which pushes the preceding unit out of position. This feeding of the units is continued. The units are discharged from the track 17 onto track 23 and roll down thereon to the front of the apparatus. Units which are found to be defective in assembly are removed as found.

The track 17 may be made of a non-magnetic material, such as brass, if desired; or it may be made of any magnetic material whose magnetic properties do not interfere with the advance of the assembled units along the track.

The magnetic poles between which the assembled units are checked or verified, as above described, may either be like or unlike poles, it being sufficient that there is sufficient magnetic pull upon the plungers 30 to retract them sufficiently for the purpose of checking the assembly.

The apparatus may include a demagnetizing coil, energized by alternating current, for demagnetizing units after they have been checked as above described. Such a coil is indicated by means of the numeral 35 in Figures 1, 2 and 3. From these figures it will be seen that the track 17 passes through the demagnetizer 35 and that the position of the demagnetizer is such that the assembled units 18 pass through it after having been subjected to the magnetic fields of the electromagnets 7 and 8.

I claim:

1. Apparatus to test the operation of a spring biased plunger made of magnetic material and which extends radially into a passage through an assembly of which said spring biased plunger forms part, said apparatus comprising an electromagnet, a support for supporting the assembly adjacent a pole of said electromagnet so that the said plunger may be attracted by said electromagnet against its spring bias, means to energize the electromagnet to attract the said plunger towards it against said spring bias and to de-energize the said electromagnet, said support having an aperture therein for alignment with the said passage through the assembly, and means for causing a beam of light to pass through said passage and aperture when they are in alignment.

2. Apparatus to test the operation of a pair of spring biased plungers made of magnetic material, mounted diametrically opposite and extending into bores in the walls of a cylinder from the interior thereof comprising a pair of electromagnets having their poles spaced apart from each other, a support for supporting the cylinder between the poles so that the plungers lie adjacent the poles, means to energize the electromagnets to retract the plungers against their spring bias and to de-energize the electromagnets, said support having an aperture therein for alignment with the bore of the cylinder and means located beneath the aperture to illuminate the interior of the cylinder.

FREDERICK H. BEACH.